2 Sheets—Sheet 2.

T. BÜHLMANN.
Apparatus for Separating and Cleaning Grits, &c.

No. 231,395. Patented Aug. 24, 1880.

UNITED STATES PATENT OFFICE.

THEODOR BÜHLMANN, OF MÜLLHEIM, SWITZERLAND.

APPARATUS FOR SEPARATING AND CLEANING GRITS, &c.

SPECIFICATION forming part of Letters Patent No. 231,395, dated August 24, 1880.

Application filed January 17, 1880.

*To all whom it may concern:*

Be it known that I, TH. BÜHLMANN, of Müllheim, Republic of Switzerland, have invented a new and Improved Apparatus for Cleaning and Separating Grits, Middlings, and Stive in Mills, of which the following is a specification.

My new and improved apparatus for cleaning and separating middlings, grits, and stive in mills (likewise applicable for other similar purposes) is represented in the annexed drawings, of which—

Figure 1:
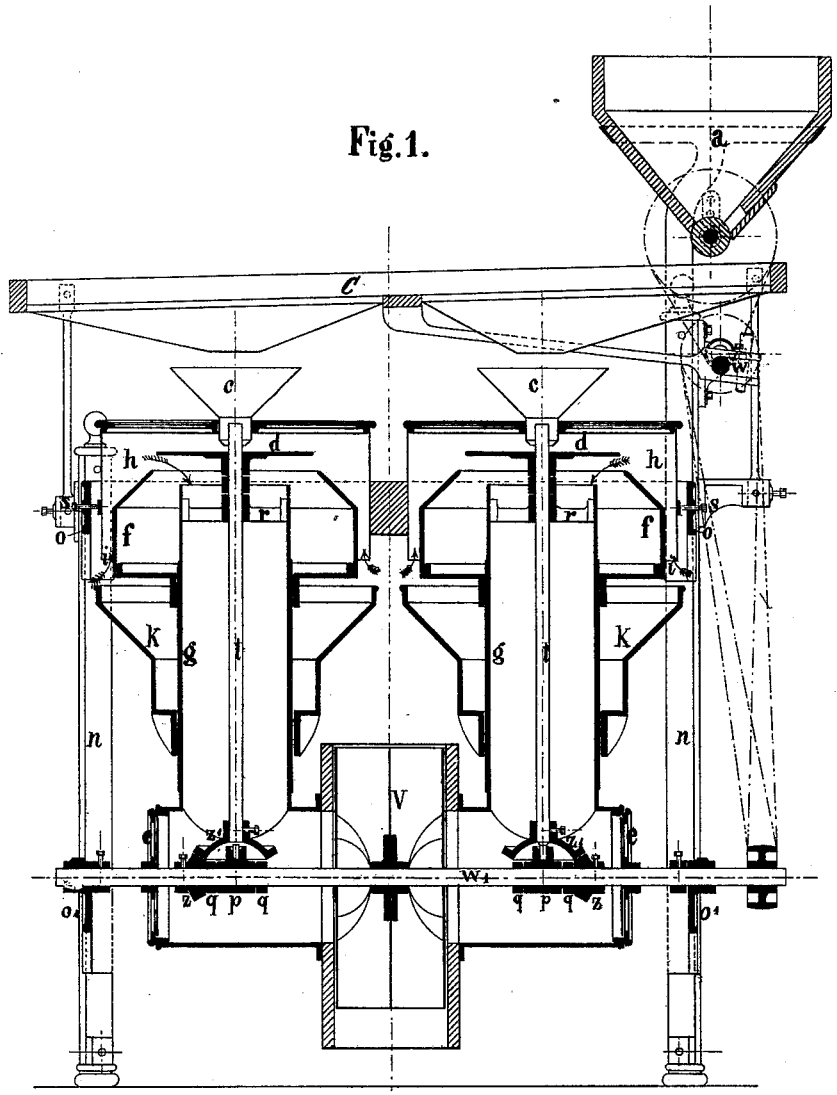
Figure 2:
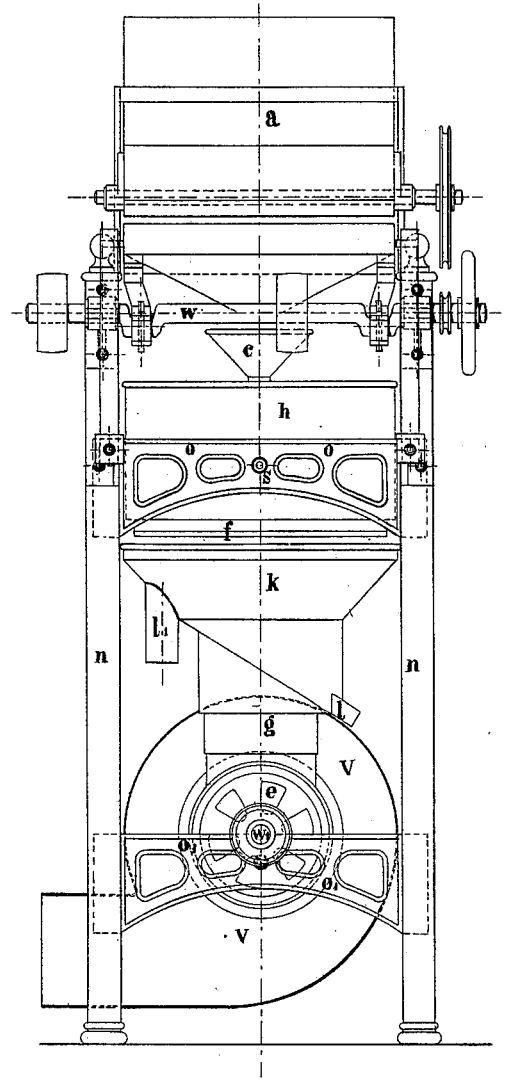
Figure 3:
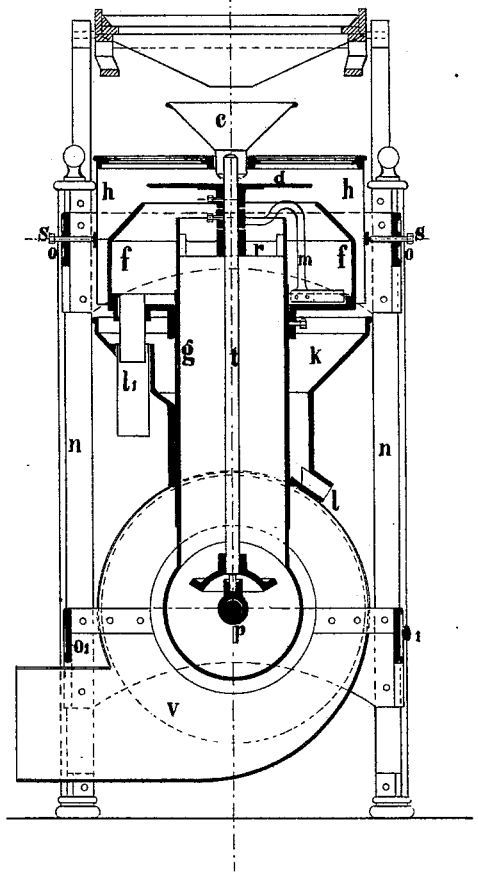

Figure 1 represents a longitudinal section of a double apparatus; Fig. 2, a side view; Fig. 3, a vertical section.

The drawings represent a double apparatus, but a single apparatus may be used, separately as well as in groups, or a series of three, four, and more single apparatus provided with a common driving-shaft.

The grits to be cleaned and separated may be delivered to the apparatus directly from the bolters, or sifters may be arranged to deliver the material to the machine. The double apparatus shown by the drawings is provided with the hopper $a$, which delivers the grits to the sifter C, agitated by the cranked shaft $w$. By means of the sifter C the grits are separated by sieves of silk gauze. From those sieves the grits fall into the hoppers $c\ c$, and therefrom to the disks $d\ d$, fixed to the vertical shafts $t\ t$, revolving with a high speed. The centrifugal force throws the grits, proportionally to their gravity, to a greater or less distance from the center against the wall of the cylinder $h$. By the influence of a draft of air produced by the ventilator $v$, placed between the two apparatus, the bran and the stive are aspirated within the tube $g$ and thrown off into a suitable separate room. The lighter parts of the grits likewise yield to the influence of the draft of the air and fall into the cylinder $f$, which surrounds the tube $g$. The heavier grits are thrown against the wall of the outer cylinder, $h$, fixed to the frame by means of the screws $s\ s\ s\ s$, and likewise fall into the hopper $k$ surrounding the tube $g$. Between the hopper $k$ and the cylinder $h$ is left an annular space, $i$, by which the draft of air passes in the direction of the arrows. As the grits are continually subjected to the draft of the air till their arrival at $i$, a complete cleaning and separating action is produced.

The cylinders $h$ and $f$, the hopper $k$, and the disk $d$ are adjusted in a suitable manner by means of screws, according to the different qualities of the grits. The grits collected within the hopper $k$ fall through the tube $l$. Those within the cylinder $f$ are transported by a shovel, $m$, to the tube $l'$. From this tube the separated and cleaned grits either are collected in suitable vessels or are transported by the usual means to suitable places, as may be required. The tubes $g\ g$ are connected by means of a horizontal tube with the fan $v$. The outer extremities of this tube are provided with annular sash-slides for the purpose of regulating the force of the draft of air.

The whole apparatus is supported by a frame, $n\ n\ o\ o'$. The vertical shafts are supported by the bearings $p$, placed on the shaft $w'$, and held in just position by the rings $q\ q$ and by the cross-pieces $r\ r$ within the tube $g$. The vertical shafts are put into revolution by the shaft $w'$ and by means of the conical friction-wheels $z\ z'$.

Referring to the arrangement of the apparatus in groups and in series, it must be mentioned that in such cases the tubes $g$ discharge into a common channel communicating with the fan.

I claim—

In combination with rotating disk $d$ and cylinders $g$ and $h$, the intermediate cylinder, $f$, having its upper end of tapering or conoidal form, and having the air-inlet $i$ at its lower end, so that the current of air passes upward through the heavier grits and then inward along said conoidal part of the cylinder before descending.

THEODOR BÜHLMANN.

Witnesses:
M. SCHMID,
J. WEPF.